(12) United States Patent
Hemena et al.

(10) Patent No.: US 6,297,970 B2
(45) Date of Patent: Oct. 2, 2001

(54) MULTIPLE OUTPUT SYNCHRONOUS RECTIFIER CIRCUIT PROVIDING ZERO VOLT SWITCH MODE OPERATION

(75) Inventors: William Hemena, Raleigh; Randhir Singh Malik, Cary, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,924

(22) Filed: Dec. 10, 1999

(51) Int. Cl.[7] .................................................. H02M 3/335
(52) U.S. Cl. .......................... 363/21.06; 363/89; 363/127
(58) Field of Search ........................ 363/84, 89, 125–127, 363/91, 93, 16, 21.06

(56) References Cited

U.S. PATENT DOCUMENTS

| | | | |
|---|---|---|---|
| 5,612,862 | * 3/1997 | Marusik et al. | 363/93 |
| 5,991,171 | * 11/1999 | Cheng | 363/21 |
| 6,038,150 | * 3/2000 | Yee et al. | 363/89 |

\* cited by examiner

*Primary Examiner*—Peter S. Wong
*Assistant Examiner*—Gary L. Laxton
(74) *Attorney, Agent, or Firm*—Sawyer Law Group, LLP

(57) ABSTRACT

A zero voltage switching synchronous rectification circuit for providing multiple output voltages from a single input voltage is disclosed. The circuit comprises a single transformer coupled to the single input voltage and at least two synchronous rectifiers, each of the at least two synchronous rectifiers being coupled to the transformer via a winding, each of the at least two synchronous rectifiers including a first controlled switching device coupled to the winding, wherein at least one of the at least two synchronous rectifiers includes a delay element, the delay element being coupled to the winding via the first controlled switching device, wherein the delay element delays the input voltage across the at least one of the at least two synchronous rectifiers for a predetermined amount of time. By incorporating a delay element with a plurality of isolated synchronous rectifiers, Zero Voltage Switching is achieved in a multiple output environment. This will improve the efficiency of multiple output circuits because the transistors will not incur the switching losses that are present in the operation of conventional synchronous rectification circuitry where a DC voltage is generated prior to generating a lower voltage output through synchronous rectification.

10 Claims, 5 Drawing Sheets

Typical Sync. DC/DC Converter

Isolated Sync. DC/DC Converter

Isolated Multiple_output Sync. DC/DC Converter

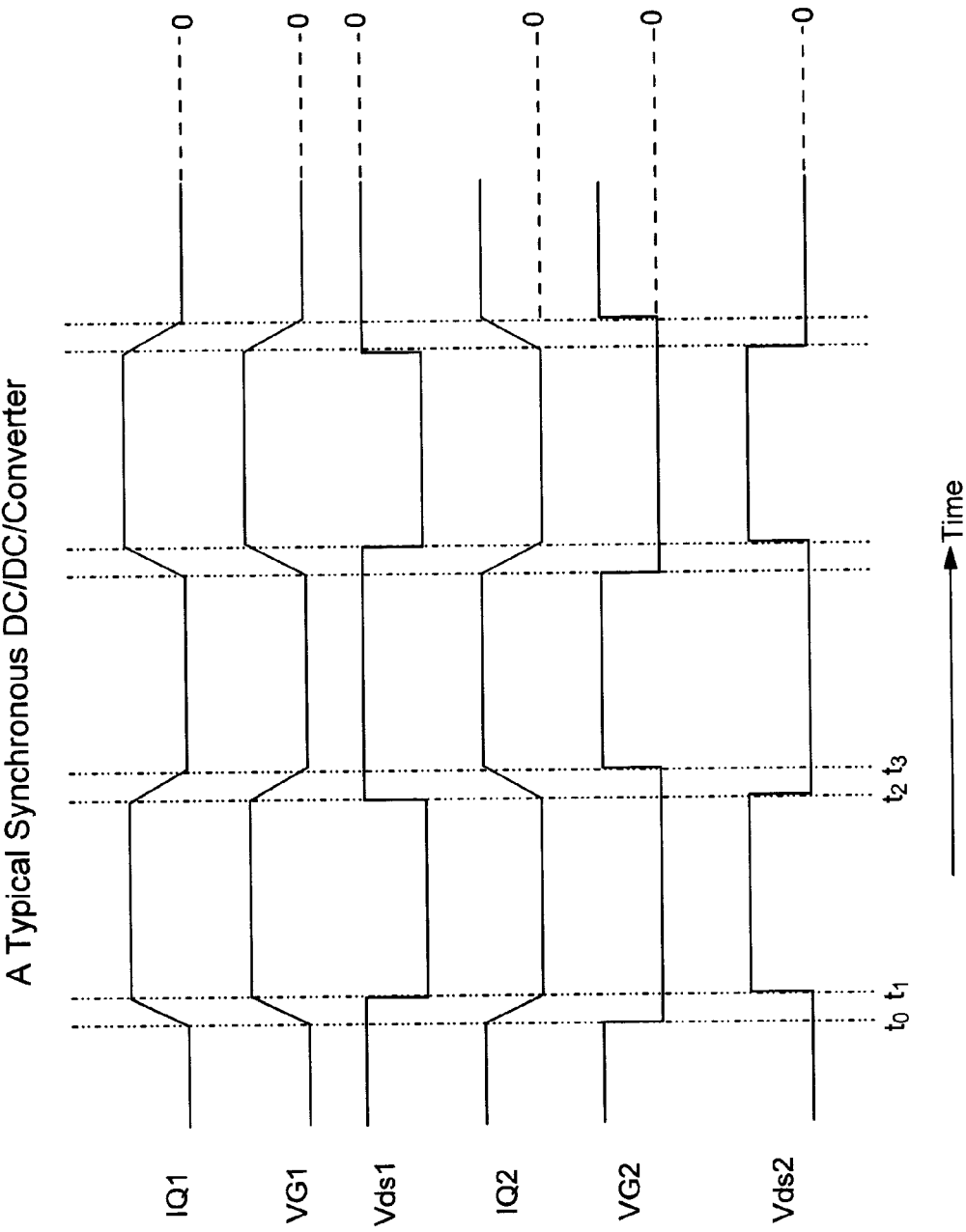
FIG. 1B Current and Voltage Waveforms

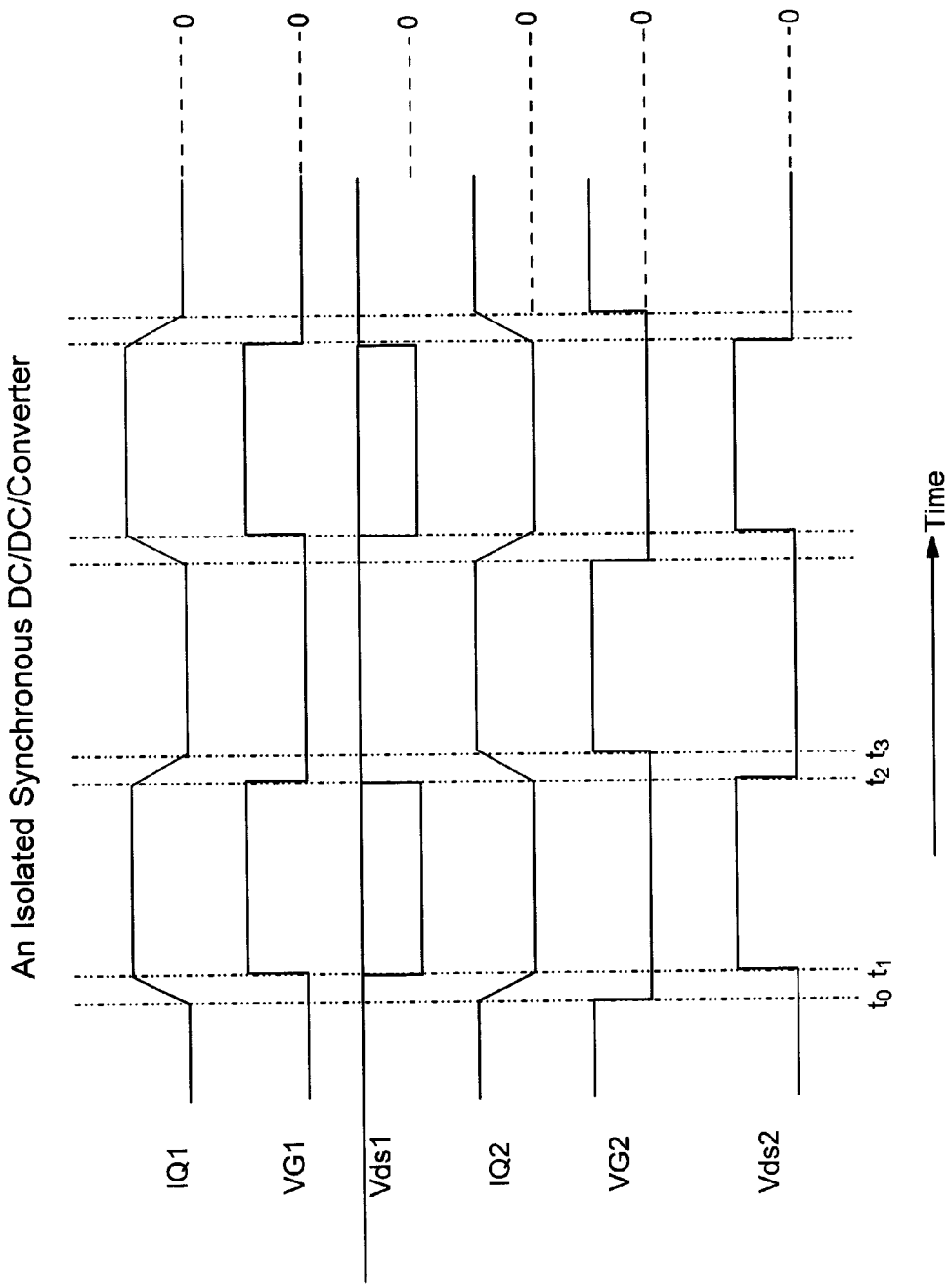
FIG. 2B Current and Voltage Waveforms
An Isolated Synchronous DC/DC/Converter

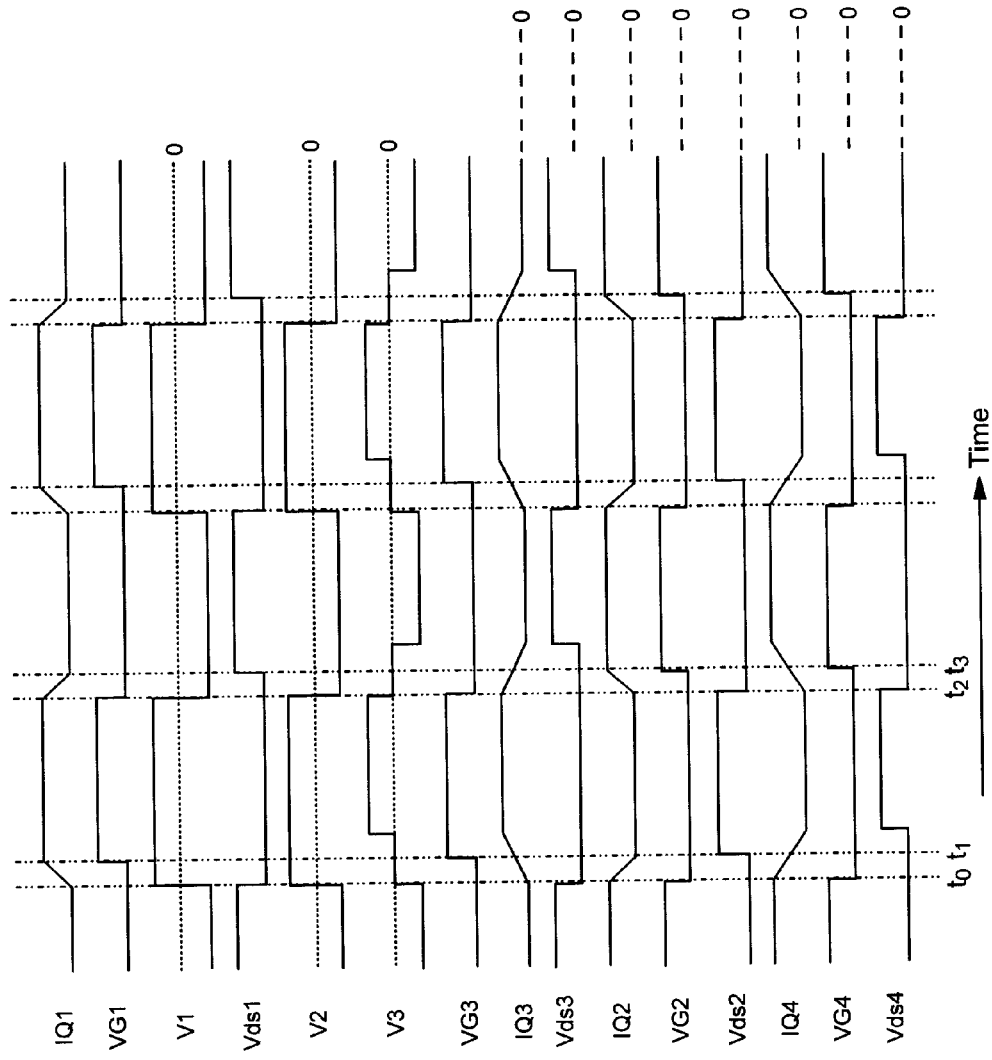
FIG. 3B  Current and Voltage Waveforms
Multiple Output Synchronous DC/DC/Converter

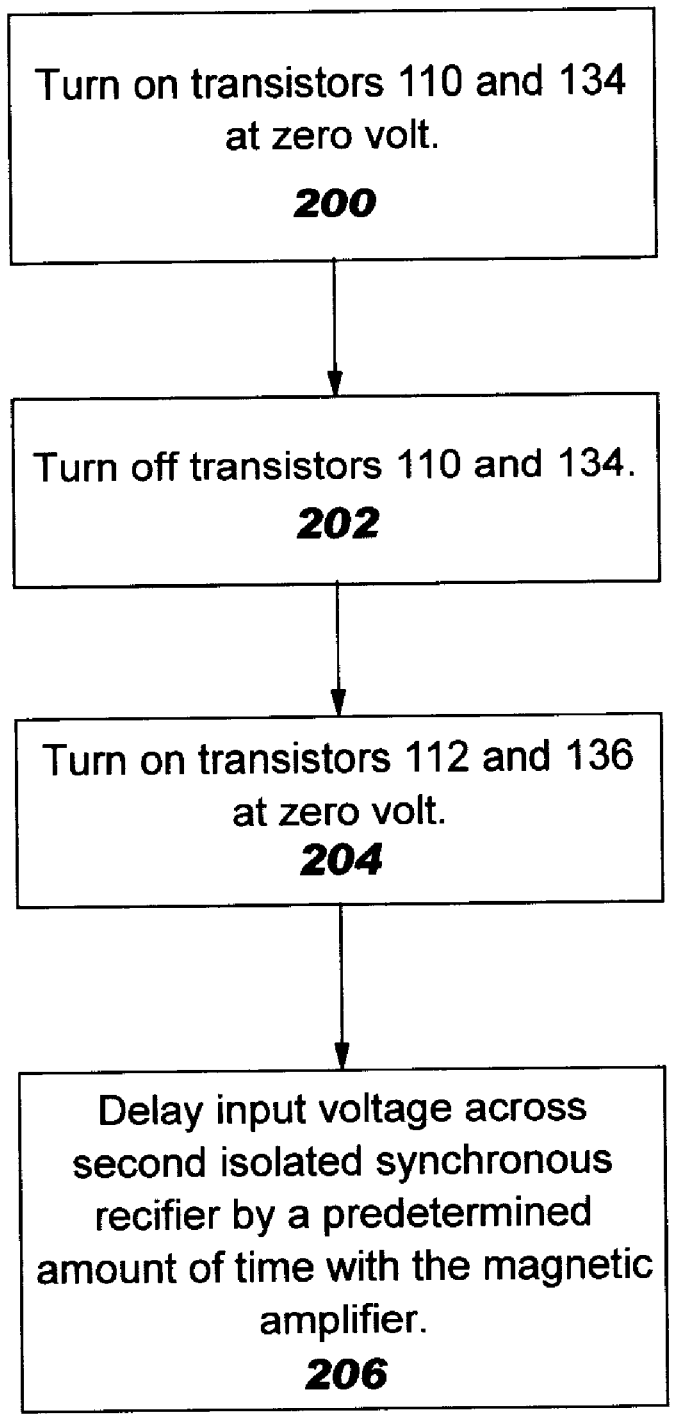

MULTIPLE OUTPUT SYNCHRONOUS RECTIFIER CIRCUIT PROVIDING ZERO VOLT SWITCH MODE OPERATION

FIELD OF THE INVENTION

The present invention relates to a multiple output circuit that achieves high efficiency by using synchronous rectification and magnetic amplifiers.

BACKGROUND OF THE INVENTION

Many of the voltage regulator modules (VRMs) used for high current application use synchronous rectification. FIG. 1a shows a typical non-isolated DC—DC converter VRM synchronous rectification circuit. The circuit includes first and second capacitors 12, 20, first and second transistors 14, 16 an inductor 18 and a pulse width modulator 20. In this type of configuration the first transistor 14 is referred to as the high switch and the second transistor 16 is referred to as the low switch. However, even though a synchronous mode of operation improves the efficiency of the DC—DC converter, it does not achieve an ideal Zero Volt Switch (ZVS) mode operation.

To better understand the operation of a typical synchronous rectification, refer to the wave form in FIG. 1b. VG1 illustrates the driving wave form of the first transistor 14 and VG2 shows the driving wave form of the second transistor 16. IQ1 is the transistor current of the first transistor 14 and IQ2 is the transistor current of the second transistor 16. Vds1 represents the drain to source voltage across the first transistor 14 and Vds2 represents the drain to source voltage across the second transistor 16.

Still referring to FIG. 1b, when the first transistor 14 is turned on at $t_0$, the voltage across it, Vds1, is approximately equal to $V_{in}$. Also, during the subsequent turn off of the first transistor 14 at $t_2$, it experiences the full input voltage, Vin, while current is still flowing through it. Therefore, the first transistor 14, unlike the second transistor 16, does not turn on at a time when there is no voltage across it. Hence, it does not operate in ZVS mode. This creates switching losses which lowers the efficiency of the circuit.

This efficiency problem is typically addressed by utilizing an isolated synchronous rectification circuit. FIG. 2a is a schematic of an isolated synchronous rectifier 30. It includes a first capacitor 31 coupled to a first high frequency transformer 32, a winding 33 coupled to the transformer 32, a first transistor 34 coupled to the winding 33, a second transistor 36 coupled to the first transistor 34, an inductor 38 coupled to the second transistor 36 a capacitor 40 coupled to the inductor 38, a third transistor 42, a second transformer 44 and a pulse width modulator 46. By incorporating the transformer 32, an ideal Zero Volt Switch (ZVS) operation is achieved in both transistors 34, 36, wherein if the first transistor 34 is on, the second transistor 36 is off and only its body diode will be conducting.

Please refer now to FIG. 2b. VG1 illustrates the driving wave form of the first transistor 34 and VG2 shows the driving wave form of the second transistor 36. IQ1 is the transistor current of the first transistor 34 and IQ2 is the transistor current of the second transistor 36. Vds1 represents the drain to source voltage across the first transistor 34 and Vds2 represents the drain to source voltage across the second transistor 36. Unlike the non-isolated synchronous rectifier, when the first transistor 34 is turned on at $t_0$, Vds1 is approximately zero volt. Furthermore, when the second transistor 36 is turned on at $t_2$, Vds2 is approximately at zero volt. Accordingly, both the first transistor 34 and the second transistor 36 operate in ZVS mode.

This solution improves efficiency, but it is only beneficial in the operation of a single output synchronous rectifier where a single output voltage is desired. Ergo, this solution would not work in a multiple output circuit where several different output voltages are provided based upon one input voltage and a single isolate transformer. For example, a typical computer power supply system may require output voltages of +3.3V, +5V, +12V, etc. Consequently, in applications where different output voltages are generated from a single input voltage, the isolated synchronous rectifier circuit of FIG. 2 is not an effective solution. Accordingly, what is needed is an improved multiple output synchronous rectification circuit. The present invention addresses such a need.

SUMMARY OF THE INVENTION

A zero voltage switching synchronous rectification circuit for providing multiple output voltages from a single input voltage is disclosed. The circuit comprises a single transformer coupled to the single input voltage and at least two synchronous rectifiers, each of the at least two synchronous rectifiers being coupled to the transformer via a winding, each of the at least two synchronous rectifiers including a first controlled switching device coupled to the winding, wherein at least one of the at least two synchronous rectifiers includes a delay element, wherein the first controlled switching device of the at least one of the at least two synchronous rectifiers is coupled to the winding via the delay element, wherein the delay element delays the input voltage across the at least one of the at least two synchronous rectifiers for a predetermined amount of time.

By incorporating a delay element with a plurality of isolated synchronous rectifiers, Zero Voltage Switching is achieved in a multiple output environment. This will improve the efficiency of multiple output circuits because the transistors will not incur the switching losses that are present in the operation of conventional synchronous rectification circuitry where a DC voltage is generated prior to generating a lower voltage output through synchronous rectification.

BRIEF DESCRIPTION OF THE DRAWINGS

FIG. 1b shows the wave forms of the rectification circuit of FIG. 1a.

FIG. 2b shows the wave forms of the rectification circuit of FIG. 2a.

FIG. 3b shows the wave forms of the multiple output synchronous rectification circuit of FIG. 3a.

FIG. 4 is a flowchart of the operation of a multiple output synchronous rectification circuit in accordance with the present invention.

DETAILED DESCRIPTION

The present invention relates to a multiple output synchronous rectification circuit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The present invention provides for a synchronous rectification circuit which provides multiple output voltages. By incorporating a delay element with a plurality of isolated synchronous rectifiers, Zero Voltage Switching (ZVS) is achieved in a multiple output environment. This will improve the efficiency of multiple output circuits because the transistors will not incur the switching losses that are present in the operation of conventional synchronous rectification circuitry.

Figure 1A:
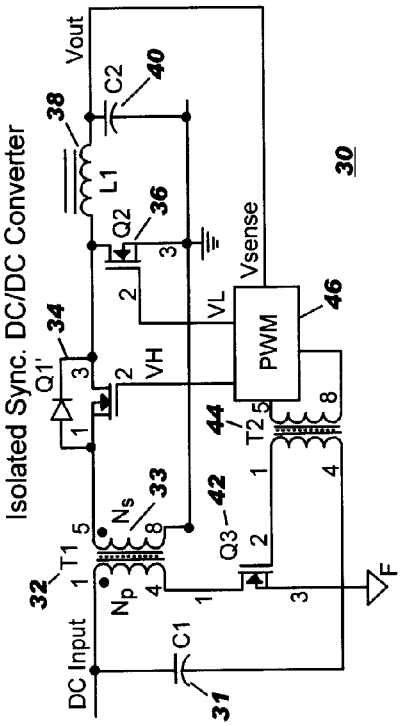
FIG. 1a is a typical non-isolated DC-DC converter VRM synchronous rectification circuit.
Figure 2A:
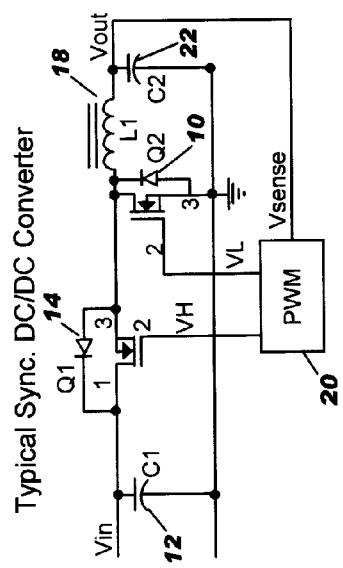
FIG. 2a shows an isolated synchronous rectifier.
Figure 3A:
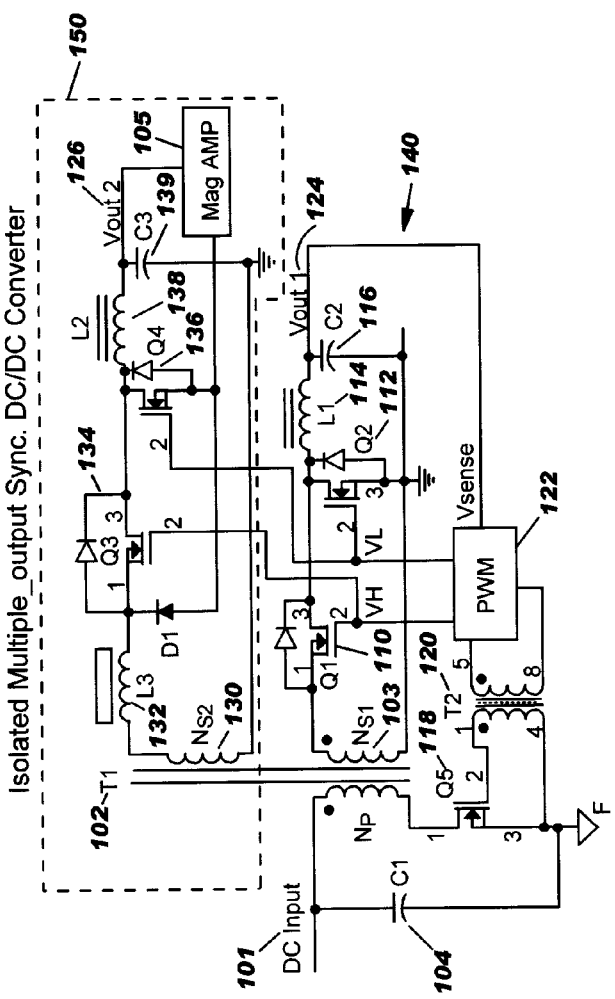
FIG. 3a shows a multiple output synchronous rectification circuit in accordance with the present invention.

FIG. 3a shows a multiple output synchronous rectification circuit 100 in accordance with the present invention. The circuit 100 includes an input voltage 101 coupled to a multiple winding transformer 102, a first isolated synchronous rectifier 140 coupled to the transformer 102 and a second isolated synchronous rectifier 150 coupled to the transformer 102. The first isolated synchronous rectifier 140 includes a first capacitor 104 coupled to the input voltage 101, a winding 103 coupled to the transformer 102, a first transistor 110 coupled to the winding 103, a second transistor 112 coupled to the first transistor 110, an inductor 114 coupled to the second transistor 112 a second capacitor 116 coupled to the inductor 114, a third transistor 118, a second transformer 120 and a pulse width modulator 122. Accordingly, the first isolated synchronous rectifier 140 operates in manner similar to that of the isolated synchronous rectifier circuit of FIG. 2.

The second isolated synchronous rectifier 150 includes a winding 130 coupled to the transformer 102, a mag-amp core 132 coupled to the winding 130, a first transistor 134 coupled to the mag-amp core 132, a second transistor 136 coupled to the first transistor 134, an inductor 138 coupled to the second transistor 136, and a capacitor 139 coupled to the inductor 138. However, in order to facilitate a multiple output configuration while maintaining ZVS operation, the second isolated synchronous rectifier 150 employs a magnetic amplifier 105 as a delay element to regulate the output voltage 126 of the second isolated synchronous rectifier 150.

The magnetic amplifier 105 comprises an error amplifier, a reference voltage, and a driver to reset the mag-amp core 132 that modulates the voltage developed across the winding 130. By utilizing the mag-amp core 132 to delay the voltage across the transistors 134, 136, the output voltage 126 of the second synchronous rectifier 150 is regulated, while transistors 134,136 continue to operate in ZVS mode.

Please refer now to FIG. 3b. IQ3 is the transistor current of the transistor 134 and IQ4 is the transistor current of transistor 136. Vds3 represents the drain to source voltage across transistor 134 and Vds4 represents the drain to source voltage across transistor 136. Accordingly, when transistor 134 is turned on at $t_0$, Vds3 is approximately zero and when transistor 136 is turned on at $t_2$, Vds4 is approximately zero. Therefore, although the voltage is delayed across the transistors 134, 136, they continue to operate in ZVS mode.

For example, the output voltage, $V_{out}$ of a synchronous rectification circuit is:

$$V_{out} = V_{in} \times \text{Duty Ratio}$$

What is meant by Duty Ratio is the amount of time that the transistors are "on" divided by the total cyclical period. Therefore, if the transistors are on for 5 microseconds and off for 5 microseconds, the total period is 10 microseconds. Hence, a Duty Ratio of 5 divided by 10 or ½. Consequently, an input voltage of 10 V with a duty ratio of ½, yields an output voltage of 5 V.

By utilizing a multiple output synchronous rectification circuit in accordance with the present invention, $V_{out}$ can be controlled by delaying the "on" time of the input voltage. For example, if the input voltage is 10 V and the desired output voltage is 4 V, the desired output voltage can be achieved by delaying the "on" time by 1 microsecond:

$$V_{out} = 10\text{V} \times \frac{4 \text{ microseconds "on"}}{10 \text{ microseconds}} = 4\text{V}$$

Even though the "on" time is delayed by the magnetic amplifier, the period is still 10 microseconds.

For a better understanding of the operation of the multiple output synchronous rectification circuit in accordance with the present invention please refer to the flowchart of FIG. 4. First, when a voltage is applied, transistors 112 and 136 are off and the transistors 110 and 134 are turned on at zero volt, via step 200. Next, the transistors 110 and 134 are turned off, via step 202. Next, the transistors 112 and 136 are turned on at zero volt, via step 204. Finally, the input voltage across the second isolated synchronous rectifier 150 is delayed by a predetermined amount of time by the magnetic amplifier 105, via step 206.

Although the preferred embodiment of the present invention is described in the context of two outputs, one of ordinary skill in the art will readily recognize that the present invention can be utilized with many outputs while remaining within the spirit and scope of the present invention. For example, if three different output voltages are required there would be a first delay element for the second output voltage and the second delay element for the third output voltage, i.e. for N number of different output voltages, there are N−1 delay elements.

By incorporating a delay element with a plurality of isolated synchronous rectifiers, Zero Voltage Switching is achieved in a multiple output environment. This will improve the efficiency of multiple output circuits because the transistors will not incur the switching losses that are present in the operation of conventional synchronous rectification circuitry.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A multiple output synchronous rectification circuit comprising:

a single transformer coupled to a single input voltage; and at least two synchronous rectifiers, each of the at least two synchronous rectifiers being coupled to the transformer via a winding, each of the at least two synchronous rectifiers including a first controlled switching device coupled to the winding, wherein at least one of the at least two synchronous rectifiers includes a magnetic amplifier core coupled to a magnetic amplifier, wherein the first controlled switching device of the at least one of the at least two synchronous rectifiers is coupled to the winding via the magnetic amplifier core, wherein the magnetic amplifier resets the magnetic amplifier core to delay the input voltage across the at least one of the at least two synchronous rectifiers for a predetermined amount of time and each controlled switching device operates in a zero voltage switching mode.

2. The circuit of claim 1 wherein each of the at least two synchronous rectifiers further comprise:
   a second controlled switching device coupled to the first controlled switching device;
   an inductor coupled to the second controlled switching device;
   a capacitor coupled to the inductor; and
   an output voltage coupled to the inductor.

3. The circuit of claim 1 wherein each of the output voltages comprise the single input voltage multiplied by a duty ratio.

4. The circuit of claim 3 wherein the duty ratio is an amount of time that the first and second controlled devices are on divided by a total cyclical period, the total cyclical period being the amount of time that the first and second controlled devices are on plus an amount of time that the first and second controlled devices are off.

5. The circuit of claim 4 wherein the amount of time that the first and second controlled devices are on is reduced by the delay element for the predetermined amount of time.

6. A multiple output synchronous rectification circuit comprising:
   a single transformer coupled to a single input voltage;
   at least two synchronous rectifiers, each of the at least two synchronous rectifiers being coupled to the transformer via a winding, each of the at least two synchronous rectifiers including a first controlled switching device coupled to the winding, wherein at least one of the at least two synchronous rectifiers includes a magnetic amplifier core coupled to a magnetic amplifier, wherein the first controlled switching device of the at least one of the at least two synchronous rectifiers is coupled to the winding via the magnetic amplifier core, wherein the magnetic amplifier resets the magnetic amplifier core to delay the input voltage across the at least one of the at least two synchronous rectifiers for a predetermined amount of time, each of the at least two synchronous rectifiers further comprising:
   a second controlled switching device coupled to the first controlled switching device;
   an inductor coupled to the second controlled switching device;
   a capacitor coupled to the inductor; and
   an output voltage coupled to the inductor wherein each controlled switching device operates in a zero voltage switching mode.

7. The circuit of claim 6 wherein the output voltage is characterized as the single input voltage multiplied by a duty ratio.

8. The circuit of claim 7 wherein the duty ratio is an amount of time that the first and second controlled devices are on divided by a total cyclical period, the total cyclical period being the amount of time that the first and second controlled devices are on plus an amount of time that the first and second controlled devices are off.

9. The circuit of claim 8 wherein the amount of time that the first and second controlled devices are on is reduced by the predetermined amount of time.

10. A multiple output synchronous rectification circuit comprising:
    a single transformer coupled to a single input voltage;
    a plurality of synchronous rectifiers, each of the plurality of synchronous rectifiers including a first controlled switching device; each of the synchronous rectifiers being coupled to the transformer via a winding, each of the plurality synchronous rectifiers including a first controlled switching device coupled to the winding, wherein at least one of the plurality of synchronous rectifiers includes a magnetic amplifier core coupled to a magnetic amplifier, wherein the first controlled switching device of the at least one of the plurality of synchronous rectifiers is coupled to the winding via the magnetic amplifier core, wherein the magnetic amplifier resets the magnetic amplifier core to delay the input voltage across the at least one of the plurality of synchronous rectifiers for a predetermined amount of time, each of the plurality of synchronous rectifiers further comprising:
    a second controlled switching device coupled to the first controlled switching device;
    an inductor coupled to the second controlled switching device;
    a capacitor coupled to the inductor; and
    an output voltage coupled to the inductor, the output voltage being characterized as the single input voltage multiplied by a duty ratio, the duty ratio being an amount of time that the first and second controlled devices are on divided by a total cyclical period, the total cyclical period being the amount of time that the first and second controlled devices are on plus an amount of time that the first and second controlled devices are off, wherein the amount of time that the first and second controlled devices are on is reduced by the predetermined amount of time and each controlled switching device operates in a zero voltage switching mode.

* * * * *